Sept. 23, 1930.   P. E. F. RAUZIÈRES   1,776,335
TOOL HOLDER
Filed July 26, 1927   2 Sheets-Sheet 1

Inventor:
Pierre Elie François Rauzières

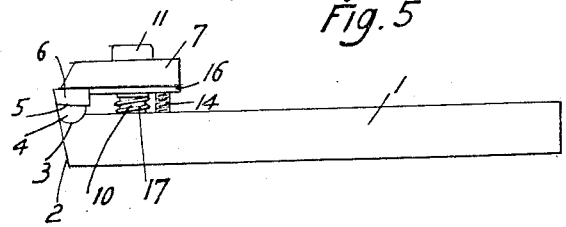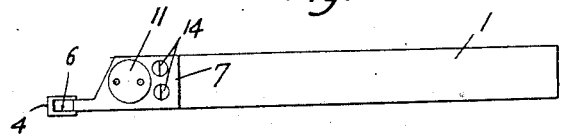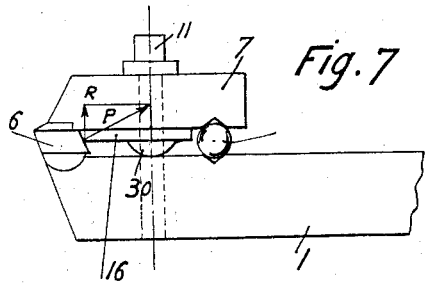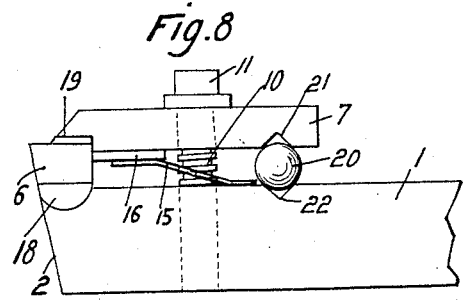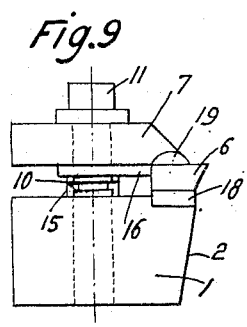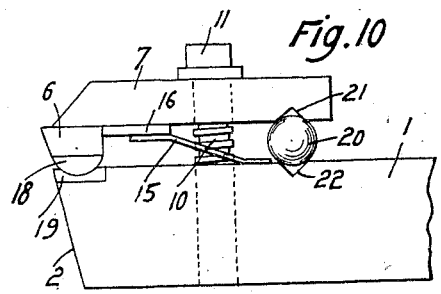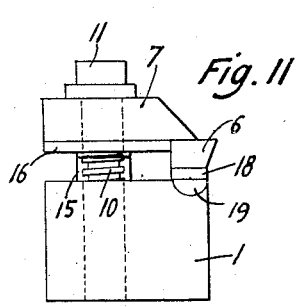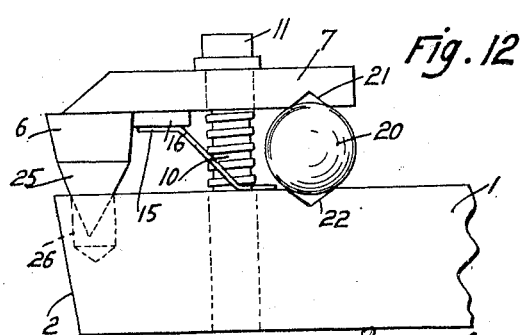

Patented Sept. 23, 1930

1,776,335

UNITED STATES PATENT OFFICE

PIERRE ELIE FRANÇOIS RAUZIÈRES, OF CLAMART, FRANCE

TOOL HOLDER

Application filed July 26, 1927, Serial No. 208,457, and in France July 29, 1926.

In the manufacture of tool holders provided with cutting points materials are now utilized the hardness of which is more and more increased, such as alloys with a base of tungsten, chromium and the like, and simple mineral substances, such as corundum, sapphire and particularly diamond.

Hitherto, the mounting of the cutting parts on tool holders has only allowed of intensive machining of soft material like plastic substances, such as fibre, or ebonite, for the reason that the cutting parts are not mounted with sufficient firmness in the tool holder and do not retain their position with satisfactory stability.

In the case of harder materials, metals for example, makers have limited themselves to slight rectifications, as the structure of the known tool holders will not allow of their use to an intensive degree. The reason of this is that owing to certain defects in the mounting of the cutting parts utilization is restricted. There are various defects chiefly the following: In the first place, in the case of the known devices, the adjustment to the tool holder of cutting parts made of hard substances and of small dimensions, is not accurate.

Moreover, when these cutting parts are made of extremely hard, brittle materials, such as the diamond, rupture of these parts is certain when they receive a blow, or are subjected to too great pressure, because the surfaces of the cutting part rest on the gripping surfaces with too few points, the pressure of which is unequal.

On the other hand, tool holders have been made in which the cutting part is permanently fixed on the tool holder, by soldering, for example, but such means which require the use of easily fused metals, and consequently very soft, have not sufficient resistance to work on hard substances like metals. Moreover, these devices are not dismountable, and to replace the cutting part the tool holder must be entirely remade.

The object of the present invention is the construction of a cutting tool holder without any of the aforesaid drawbacks. This tool holder consists essentially in the cutting part which is loosely mounted between the jaws of the holder and as automatically gripped by these jaws in a uniform manner on its bearing surfaces.

The invention also comprises a form of construction consisting essentially in the cutting part being mounted on the holder by means of a universal joint in such a way that this member can be moved into such a position that its surfaces will rest accurately on the gripping parts of the holder.

Due to this arrangement the cutting part adapts itself exactly to the form of the jaws of the tool holder and can thus withstand very high pressures without breaking. Moreover, this tool holder has the advantage of adapting itself with nice precision to all cutting parts made of hard substances; finally it can be mounted with great facility.

The tool holder forming the object of the present invention, therefore, enables a scientific and economic cutting to be effected irrespective of the resistance of the material being worked on.

Various embodiments of the invention are shown by way of example in the accompanying drawings in which—

Figs. 5 and 6 are respectively an elevation and a plan view of a modification.

Fig. 7 is an elevation of another modification.

Figs. 8 and 9 are respectively an elevation and an end view of another modification.

Figs. 10 and 11 are respectively an elevation and an end view of a modification of the modification shewn in Figs. 8 and 9.

Fig. 12 is another variation of the invention in elevation.

Figure 1:
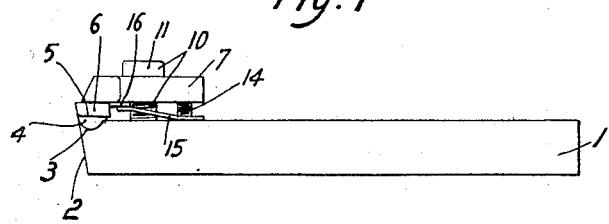
Fig. 1 is an elevation of a lathe or traversing tool.
Figure 2:
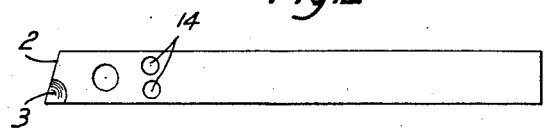
Fig. 2 is a plan view of the lower part of the holder.

The body 1 of the holder is provided with an end 2 cut to a bevel; a spherical cavity 3 is sunk in the upper surface of the bevel 2 and serves as a seat for an intermediary spherical part 4 which is fitted accurately into the spherical cavity 3 and has an upper plane surface 5. Thus, a ball and socket joint is made between the intermediary member 4 and the body 1 of the tool holder.

The cutting tool 6 consisting, for example, of a cut diamond, rests with its lower surface $6^1$ on the intermediary part 4 whilst its upper surface $6^2$ is held by a cap 7.

The two surfaces $6^1$ $6^2$ have a certain incline towards each other, and the thickness of the cutting tool 6 varies from E to e, i. e. from the inside to outside of the tool holder 1.

The cap 7 is connected as follows with the body 1 of the tool holder; a central screw bolt 10 passes through the cap and is screwed in the body 1, the head 11 of this screw being applied against the cap 7. Two screws 14 are provided in the cap 7, the points of said screws resting in cavities made in the upper surface of the body 1.

A plate spring 15 is provided with openings so that it can engage under the screws 14 and with the central screw bolt 10, the said spring also bearing against a stop 16 held by tenons 17 in recesses in the cap 7.

Figure 4:
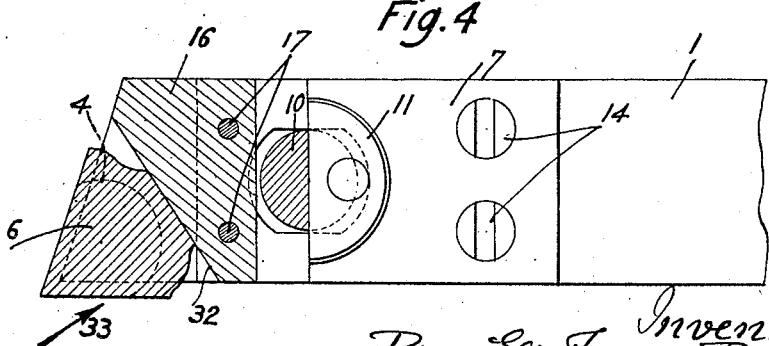

This stop 16 has a suitably inclined plane surface 32 (Fig. 4) for the purpose hereinafter explained.

The operation of the device described is as follows:

The cutting tool 6 bearing with one of its surfaces on the intermediary piece 4 which itself is mounted with a ball and socket joint on the body 1 of the tool holder, can be given such an incline that the cap 7 will bear exactly on the upper surface of the cutting tool 6. Consequently, the cutting tool 6 is gripped between two surfaces between which it fits nicely. In this way the cutting tool will be prevented from resting irregularly on the clamping members of the tool holder 1, as is the case in the known holders and consequently a rupture of the cutting tool 6 is avoided, while at the same time, the cutting tool can be very strongly clamped in position. Thus, a very solid and very accurate mounting of the cutting member is obtained so that great precision can be obtained in cutting with this tool.

The cap 7 is retained in place by the central screw bolt 10, the cap being supported, on the one hand, by the screws 14 on the body 1 of the tool holder, and on the other, by the cutting tool 6. This arrangement therefore makes it possible to regulate as required, the position of the cap 7 according to the thickness of the cutting tool 6 by turning the screws 14 and the central screw bolt 10. The cutting tool 6 is retained in place by the stop piece 16 and the latter is retained in place by the spring 15 which presses it against the cap 7.

Figure 3:
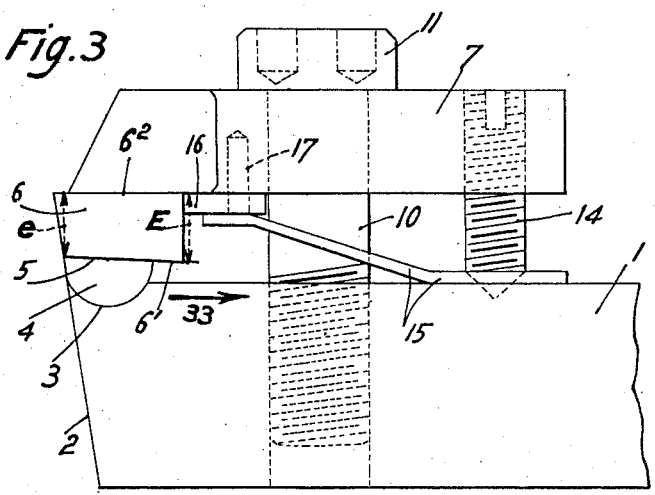
Figs. 3 and 4 are respectively an elevation and a half-section of the end of the tool holder drawn to a larger scale.

Consequently, when the cutting tool 6 is clamped in position, due to the incline given to its surfaces $6^1$ $6^2$, it has a tendency to slip toward the rear as shown by the arrow 33 in Fig. 3. The tool then impinges with its rear surface against the inclined surface 32 of the stop 16 and this limits the backward sliding of the tool 6.

By the arrangement described it is possible to keep the cutting tool in place without any need of lateral guiding or supporting surfaces on the tool. It suffices to merely give the contact surface 32 such a direction that it will oppose sliding of the tool. Thus, the cutting of the tool is simplified and its cost price is reduced.

As shown in Figs. 5 and 6, the plate spring 15 can be replaced by a helical spring 17 encircling the central screw bolt 10.

The modification shown in Fig. 7 avoids another difficulty explained hereinafter.

In the foregoing devices, the cutting tool 6, due to reaction of the material being worked on, is pushed toward the back of the tool holder and consequently pushes back the stop 16. If no precaution is taken in the choice of the contact surfaces of the cutting tool and the stop piece, it may happen that the pressure of the tool on the stop will have a vertical component, the effect of which is to compress the spring 15 or 17 and produce undue displacement of the stop downwardly.

The modification shown in Fig. 7 avoids this drawback. In this embodiment, the cutting tool 6 and the stop 16 have the contact surfaces of such a profile that the push P exerted by this member on the stop has a vertical component R, the effect of which is to push this stop against the cap 7 and avoid all further reaction on the spring consisting, for example, of a curved washer 30.

The ball and socket joint 3, 4, Figs. 1 to 4, can also be replaced by a universal joint formed by two semi-cylindrical intermediary members 18, 19 (Figs. 8 and 9) between which the cutting tool 6 is placed, these intermediary parts being themselves engaged in cylindrical cavities made respectively in the body 1 and in the cap 7. This device works in just the same way as those of Figs. 1 to 7, it being always possible to give the cutting tool 6 any incline according to that of its upper surface.

Instead of placing the two half-cylindric intermediary parts 18 and 19 on each side of the cutting tool 6, (Figs. 10, 11) they can be on the same side of the cutting tool 6, and they are fitted into each other and can turn one relative to the other. A universal joint is also thus made between the cutting tool 6 and the body 1 of the tool holder.

In the device shewn in Figs. 1 to 7, it is supposed that the space between the cap 7 and the body 1 of the tool holder is assured by the two screws 14. This space can also be provided for by means of two balls 20 resting in cavities 21, 22 of the cap 7 and the body 1 (Figs. 8 to 11), the two balls 20 also resisting all transverse movement of the cap 7 relative to the body 1. The two balls 20 can obviously be replaced by a small rolling cylinder. The cutting tool 6 can be clamped with the screw bolt 10, between the intermediary parts 18, 19 so that the tool consisting of a very hard substance, penetrates into the softer metal of the intermediary part 19 and lodges therein. Thus all displacement of the cutting tool relative to the stop is effectively prevented. The cutting tool 6 can also be directly clamped on the cap 7, the said cutting tool being fixed directly thereon.

The joint represented in Fig. 12 made between the cutting tool 6 and the body 1 of the tool holder may also be adopted, in which a cone shaped part 25, the base of which supports the cutting tool 6 is engaged in a cylindrical cavity 26 of the body 1. In this manner also the incline of the cutting tool 6 can be sufficiently varied according to the incline of the upper and lower surfaces of this cutting tool.

I claim:

1. In a tool-holder, in combination a body-part, a clamping cap, a single clamping and positioning means for securely connecting together said cap and said body-part, a cutting tool movably mounted between said body-part and said cap, and a universal joint forming a bearing for said cutting tool so as to enable it to automatically position itself under the action of said clamping means, until it will be uniformly and firmly clamped along its bearing surfaces.

2. In a tool-holder, in combination a body-part, a clamping cap, a clamping and positioning means for securely connecting together said cap and said body-part, a cutting tool movably mounted between said body-part and said cap, and a universal joint forming a bearing for said tool and composed of two cylindrical axes of 90° relative to each other so as to enable said tool to automatically position itself under the action of said clamping means until it is uniformly and firmly clamped along its bearing surfaces.

3. In a tool-holder, the combination of a body-part, a clamping cap, means for clamping said cap to said body-part, a cylindrical member mounted in a cylindrical seat of said body-part, a second cylindrical member mounted in a cylindrical seat of said cap at an angle of 90° relative to said first cylindrical member, and a cutting tool movably resting on said two cylindrical members, the latter forming a universal joint so as to enable said tool to automatically position itself under the action of said clamping means until it is uniformly and firmly clamped along its bearing surfaces between said two cylindrical members.

4. In a tool-holder, the combination of a body-part, a clamping cap, means for clamping said cap to said body-part, a cutting tool movably mounted between said body-part and said cap, a stop for retaining in position said cutting tool and preventing its backward displacement, said stop being provided between said body-part, and said cap and being of less thickness than the free space between said body-part and said cap, and a spring bearing against said body-part and pressing said stop against said cap.

5. In a tool-holder, the combination of a body-part, a clamping cap, means for clamping said cap to said body-part, a cutting tool movably mounted between said body-part and said cap and having a surface rearwardly inclined relative to a horizontal plane, a stop provided between said body-part and said cap and having a surface forwardly inclined relative to a horizontal plane, said inclined surface contacting with the inclined surface of said cutting tool, the arrangement being such that a pressure exerted by said cutting tool on said stop has a vertical component tending to press said stop against said cap.

6. In a tool-holder, the combination of a body-part, a clamping cap, means for clamping said cap to said body-part, a cutting tool movably mounted between said body-part and said cap and having a surface rearwardly inclined relative to the axis of said body-part, and a stop provided between said body-part and said cap and having a surface forwardly inclined relative to the axis of said body-part, said face resting against the inclined face of said cutting tool, the latter being thus prevented from a rearward displacement.

In testimony whereof I affix my signature.

PIERRE ELIE FRANÇOIS RAUZIÈRES.